United States Patent
Kaye

(10) Patent No.: US 9,400,163 B2
(45) Date of Patent: Jul. 26, 2016

(54) METHOD AND APPARATUS FOR PROCESSING A LENGTH OF MATERIAL

(71) Applicant: Deere & Company, Moline, IL (US)

(72) Inventor: Brett James Kaye, Tauranga (NZ)

(73) Assignee: DEERE & COMPANY, Moline, IL (US)

( * ) Notice: Subject to any disclaimer, the term of this patent is extended or adjusted under 35 U.S.C. 154(b) by 509 days.

(21) Appl. No.: 13/907,318

(22) Filed: May 31, 2013

(65) Prior Publication Data

US 2014/0012538 A1   Jan. 9, 2014

(30) Foreign Application Priority Data

Jun. 6, 2012   (NZ) ........................................ 600483
Mar. 15, 2013   (NZ) ........................................ 608293
Apr. 12, 2013   (AU) ................................. 2013204148

(51) Int. Cl.
  *G01B 7/04*   (2006.01)
(52) U.S. Cl.
  CPC ...................................... *G01B 7/042* (2013.01)
(58) Field of Classification Search
  CPC ...... G01B 7/042; G01B 5/0035; B27B 1/007; Y10T 83/531
  USPC ............. 702/149, 150, 158; 73/597; 144/335, 144/338, 34.1; 700/171
  See application file for complete search history.

(56) References Cited

U.S. PATENT DOCUMENTS

| | | | |
|---|---|---|---|
| 5,457,635 | A | 10/1995 | Scott |
| 7,603,904 | B2 | 10/2009 | Harris et al. |
| 7,938,156 | B2 | 5/2011 | Latos |
| 2004/0074563 | A1 | 4/2004 | MacNeil et al. |
| 2007/0246125 | A1 | 10/2007 | Latos |

FOREIGN PATENT DOCUMENTS

| | | |
|---|---|---|
| CA | 2569412 | 5/2008 |
| EP | 0812666 A2 | 12/1997 |
| NZ | 545247 A | 5/2007 |

OTHER PUBLICATIONS

Information on ForestBucker™ (7 pages) (copyright 2013, published at least as of May 28, 2013).
Information on ForestBucker™ (5 pages) (copyright 2012, published at least as of Mar. 6, 2012).
Examination Report from New Zealand Intellectual Property Office in Counterpart NZ Patent Application No. 608293 (2 pages) (Mar. 22, 2013).

*Primary Examiner* — John H Le

(57) ABSTRACT

An apparatus for processing a length of material, comprises at least one processor configured to: receive a signal indicating manual designation of a point along the length of material as a first end point; receive at least one signal from at least one distance measuring device associated with a timber-working head, the signal indicating the distance between the first end point and a second end point on the length of material; and determine the actual length of material to be processed. An associated method is disclosed.

20 Claims, 4 Drawing Sheets

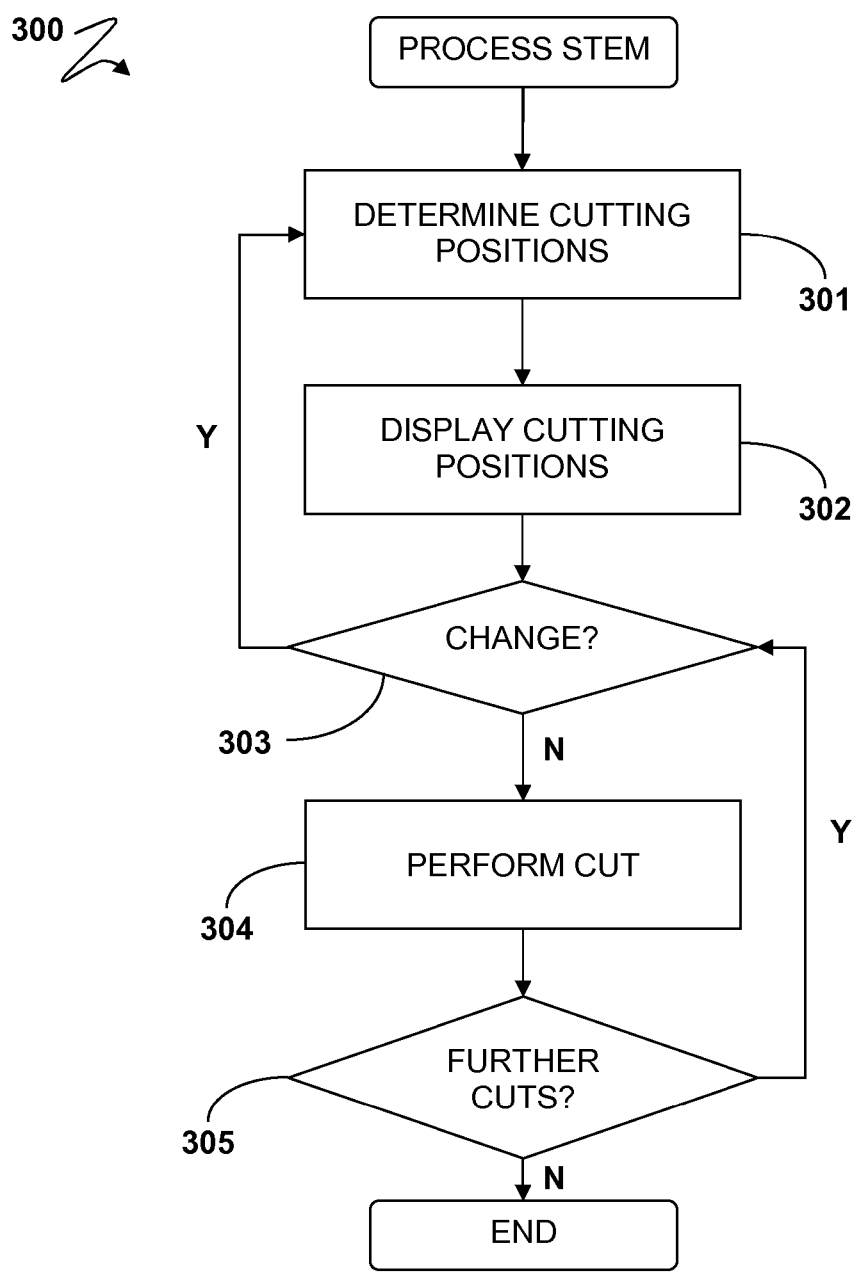

METHOD AND APPARATUS FOR PROCESSING A LENGTH OF MATERIAL

This application claims priority to New Zealand Provisional Patent Application No. 600483 filed 6 Jun. 2012, New Zealand Patent Application No. 608293 filed 15 Mar. 2013, and Australia Patent Application No. 2013204148 filed 12 Apr. 2013, the disclosures of which are incorporated herein by reference.

TECHNICAL FIELD

The present disclosure relates to a method and apparatus for processing a length of material. In particular this disclosure relates to a method and apparatus for processing a portion of wood such as a stem, log, or other piece of wood.

BACKGROUND OF THE DISCLOSURE

The modern forestry industry is continually seeking to improve efficiency in processing wood. It is well-known to mount a timber-working head, for example in the form of a harvesting head, to a forestry work machine to perform a number of functions in connection with timber. Such heads may be used to grapple and fell a standing tree and process the felled tree by delimbing, possibly debarking (depending on the configuration of the head), and cutting the stem of the tree.

Many such harvester heads have the ability to measure the diameter and length of a log and automatically determine the optimal position of saw cuts in order to maximise the value of that log.

U.S. Patent Application Publication No. 2004/0074563 illustrates a method of producing a log cutting solution based on a model of a delimbed log. The disclosure refers to optimising the cutting based on either prioritising particular lengths, or the total dollar value of the combination of lengths which may be produced from a log.

Automation of this process would be expected to improve productivity. Previously, an operator may have been required to calculate optimal value manually, or manually control the harvester head to perform cutting at previously measured and marked points along the stem. U.S. Pat. No. 5,457,635 describes a portable apparatus for measuring and marking a felled tree prior to it being processed. This either requires additional labour units to complete, or takes harvester operators away from their core tasks, resulting in low productivity.

However, there are instances which still require the operator to manually determine and perform optimisation. In particular, systems such as U.S. Patent Application Publication No. 2004/0074563 do not account for situations where the log includes a defect such as a broken top which will significantly affect the value of the wood at that point.

A stem optimisation system which seeks to account for defects in a tree stem is provided by the ForestBucker™ manufactured by Electronics123 Limited at the time of filing the present application, see <http://forestbucker.electronics123.co.nz/Home/ForestBucker>. This system scans a tree stem in order to identify defects in the stem and develops a cutting solution which accounts for these defects as well as length and profile.

However, this system requires the use of large scale equipment, such as a trolley configured to run on tracks the length of the log. This set up requires a significant amount of space and a relatively even terrain, which may not be available at the site in which the harvester is operating. Further, one of the advantages to modern mechanical harvester heads is the ease with which they may be fitted to wheeled or tracked vehicles in order to improve portability and enable them to be used in relatively rough terrain. The use of a log scanner at a fixed location would limit the usefulness of such harvester heads.

Additionally, a separate scanning or measurement apparatus would require additional processing steps—including the placement of the log for scanning, waiting for the scanning to be completed, and subsequently retrieving the log in order to perform the sawing. The associated downtime for the harvester head and harvester operator would reduce productivity.

As such, where a significant defect is identified by an operator during processing of a log, the operator is currently required to manually determine the optimal cutting solution for the log. This process takes time and causes operator stress and fatigue, which may in turn lead to errors in optimisation and lost value to the forest owner.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements, integers or steps, but not the exclusion of any other element, integer or step, or group of elements, integers or steps.

Further aspects and advantages of the present disclosure will become apparent from the ensuing description which is given by way of example only.

SUMMARY OF THE DISCLOSURE

According to one aspect of the present disclosure there is provided a method for use in processing a length of material utilising a timber-working head, comprising the steps of:
    measuring the distance between a first end point on the length of material and a second end point on the length of material with a distance measuring device associated with the timber-working head to determine the actual length of material to be processed,
    wherein the first end point is manually designated as being the first end point.

According to another aspect of the present disclosure there is provided an apparatus for processing a length of material, comprising:
    at least one processor configured to:
        receive a signal indicating manual designation of a point along the length of material as a first end point;
        receive at least one signal from at least one distance measuring device associated with a timber-working head, the signal indicating the distance between the first end point and a second end point on the length of material; and
        determine the actual length of material to be processed.

In a preferred embodiment the present disclosure includes determining at least one cutting position along the actual length of material, such that the value of lengths of material between the end points and cutting position is optimised.

According to another aspect there is provided a system for processing a length of material, comprising:
a timber-working head, comprising:
at least one cutting means;
a drive mechanism configured to drive the length of material relative to the harvester head; and
at least one distance measuring device; and
at least one processor configured to:
receive a signal indicating manual designation of a point along the length of material as an first end point;
receive at least one signal from the distance measuring device, the signal indicating the distance between the first end point to a second end point on the length of material with a sensor;
determine the actual length of material to be processed;
determine at least one cutting position along the actual length of material, such that the value of lengths of material between the end points and cutting position is optimised; and
control the timber-working head to cut the length of material at the cutting position using the cutting means.

Preferably the timber-working head is a harvester head, and may be referred to as such throughout the specification. Harvester heads typically have the capacity to grapple and fell a standing tree, delimb and/or debark a felled stem, and cut the stem into logs. However, a person skilled in the art should appreciate that the present disclosure may be used with other implements which perform cutting or sawing in the course of processing a length of material, especially where a defect may be manually identified at some point along the length of that material.

Also, reference will herein be made throughout the specification to the length of material as being the stem of a tree. It should be appreciated that while it is envisaged that the present disclosure may have particular application to the processing of a felled tree stem, this is not intended to be limiting. For example, the present disclosure may be used in the processing of other wood products—such as wood which has been sawn into boards—although the principles of the present disclosure could be applied to effectively any material where it is desirable to involve the operator in identifying defects in the length being processed in order to influence optimisation of a cutting position.

Reference to actual length of material to be processed should be understood to mean the length of material which has been determined to be, or designated as, useable. In the context of processing of a tree stem, the actual length may be the distance between a previous saw cut and a point at which a defect in the stem—such as a broken end or spike knot—may be sawn off.

Preferably the cutting means includes at least one saw blade. Harvester heads may include a main saw which is primarily used for the felling and cross cutting of stems. Further, some harvester heads may include a secondary or topping saw. The topping saw is typically of a lower specification than the main saw, and used primarily during processing once a tree is felled. It should be appreciated that the present disclosure may determine the length of material to be processed and/or the cutting positions based at least in part on the relative positions of the main saw and topping saw.

Harvester heads typically include a drive mechanism in the form of at least one driven feed wheel—for example feed wheels mounted on grapple arms which grip the stem and control position of the stem relative to the saw or saws. The drive mechanism allows the stem to be moved along a feed axis of the harvester head for debarking, delimbing, and sawing.

A distance measurement device may be incorporated into or associated with the drive mechanism, or a separate device. An example of a distance measurement device is a rotary encoded measuring wheel, which rotates as a stem is driven relative to the harvester head.

In a preferred embodiment the harvester head measures other characteristics of the stem. In particular, the harvester head preferably measures diameter of the stem. It is known to measure diameter using deflection of the delimbing knives, or drive arms. Other characteristics such as stiffness or strength may also be measured, for example as described in New Zealand Patent No. 545247 titled "Method and apparatus for assessing or predicting the characteristics of wood".

Manual designation of the first end point may be achieved by any suitable means known in the art. For example, the manual designation may be achieved by the selection of a button on a user interface used to control operation of the harvester head.

Preferably manual designation of the first end point is performed by the operator of the harvester head. The operators of such harvester heads typically have experience with identifying defects in a tree stem, are aware of the likely effect on value of such defects, and are constantly monitoring processing of the stem anyway. Drawing on this experience to capture the presence of defects in order to delimit the actual length of stem to be processed is considered to be more time and cost effective than currently available scanning technology.

It should be appreciated that manual designation of the first end point may be performed after measurement from the second point has been performed. For example, the harvester may make a saw cut designating the second end point and initiating distance measurement. The harvester head may then feed the stem through to a point which the operator manually designates as the first end point. The distance from the previous saw cut will have been measured by the harvester head anyway, and may not require re-measurement after the manual designation has occurred.

In one embodiment the manual designation of the first end point interrupts a previously established processing sequence of the length of material. For example, the harvester head may be travelling towards a next cutting position in an automated routine when the operator manually designates an end point before reaching that cutting position, or manually feeds the stem past the previously designated cutting position.

In a preferred embodiment the manual designation of the first end point includes an operator initiating re-optimisation of the material being processed.

In some known optimisation methods, data relating to the stems previously processed by the harvester head may be used to predict the optimal cutting positions for the next stem. In doing so, the harvester does not need to measure the length of the stem prior to processing it.

This is done for a number of reasons, primarily the demand for time efficiency. The length of time it takes to measure the entire length of the log prior to developing the cutting solutions and carrying them out is not ideal. Further, it is generally desirable to reduce the number of passes a harvester head needs to make along the stem in order to reduce the damage to the stem by the drive rollers—particularly for softer or ornamental wood where the value may decrease with bruising.

It is envisaged that the present disclosure may have particular application to harvesting systems which use such a prediction method for optimisation. The present disclosure may allow standard operating procedures to be carried out, while providing the option to interrupt the process and permit re-optimisation of the remaining length of the stem using the manually designated end point.

In doing so, there may be minimal interruption to standard operating procedures, while allowing for the greatest value to be derived from the stem when the operator identifies a defect.

Further, this prediction uses the length of the stems previously measured during processing, and uses the current diameter measurement to predict the likely remaining useable length of the stem currently being processed. It is envisaged that when the present disclosure is used to manually designate an end point, the data collected in relation to that stem may be disregarded for the purpose of the ongoing calibration of the standard optimisation process. In doing so, the effect of the abnormality of the present stem on the accuracy of the standard optimisation process may be reduced.

The process of optimising the value of logs which may be obtained from a stem is well known in the art. In addition to length, the value of a log may include factors such as diameter and grade. A value matrix uses these measured variables together with market prices to determine the most valuable combination of lengths which may be obtained from the actual length of the stem. Optimisation may also account for targeted length and diameters for a particular stand of trees, which meets the demands of the forest owner while perhaps not producing the highest dollar value combination based on market values.

In a preferred embodiment, the cutting positions are determined such that the end of the stem with the larger diameter is prioritised over the end with the lesser diameter. While this is not intended to be limiting, it is envisaged that in doing so wastage may be reduced.

It is envisaged that the proposed cutting positions may be presented to the operator sequentially. In a preferred embodiment the operator may be able to manually alter the grade of the length of material to be processed next. In doing so, optimisation of the remainder of the stem to be processed may be performed again, and new cutting positions determined.

Further, the operator may be able to override the next cutting position and select another position. As above, optimisation of the remainder of the actual length may be performed again, and new cutting positions determined.

The various illustrative logical blocks, modules, circuits, and algorithm steps described in connection with the embodiments disclosed herein may be implemented as electronic hardware, computer software, or combinations of both. In particular, they may be implemented or performed with a general purpose processor such as a microprocessor, or any other suitable means known in the art designed to perform the functions described.

The steps of a method or algorithm and functions described in connection with the embodiments disclosed herein may be embodied directly in hardware, in a software module executed by a processor, or in a combination of the two. If implemented in software, the functions may be stored as processor readable instructions or code on a tangible, non-transitory processor-readable medium—for example Random Access Memory (RAM), flash memory, Read Only Memory (ROM), hard disks, a removable disk such as a CD ROM, or any other suitable storage medium known to a person skilled in the art. A storage medium may be connected to the processor such that the processor can read information from, and write information to, the storage medium.

BRIEF DESCRIPTION OF THE DRAWINGS

Further aspects of the present disclosure will become apparent from the ensuing description which is given by way of example only and with reference to the accompanying drawings in which:

FIG. 3 is a flowchart illustrating a method for processing a stem;

DETAILED DESCRIPTION OF THE DISCLOSURE

Figure 1:
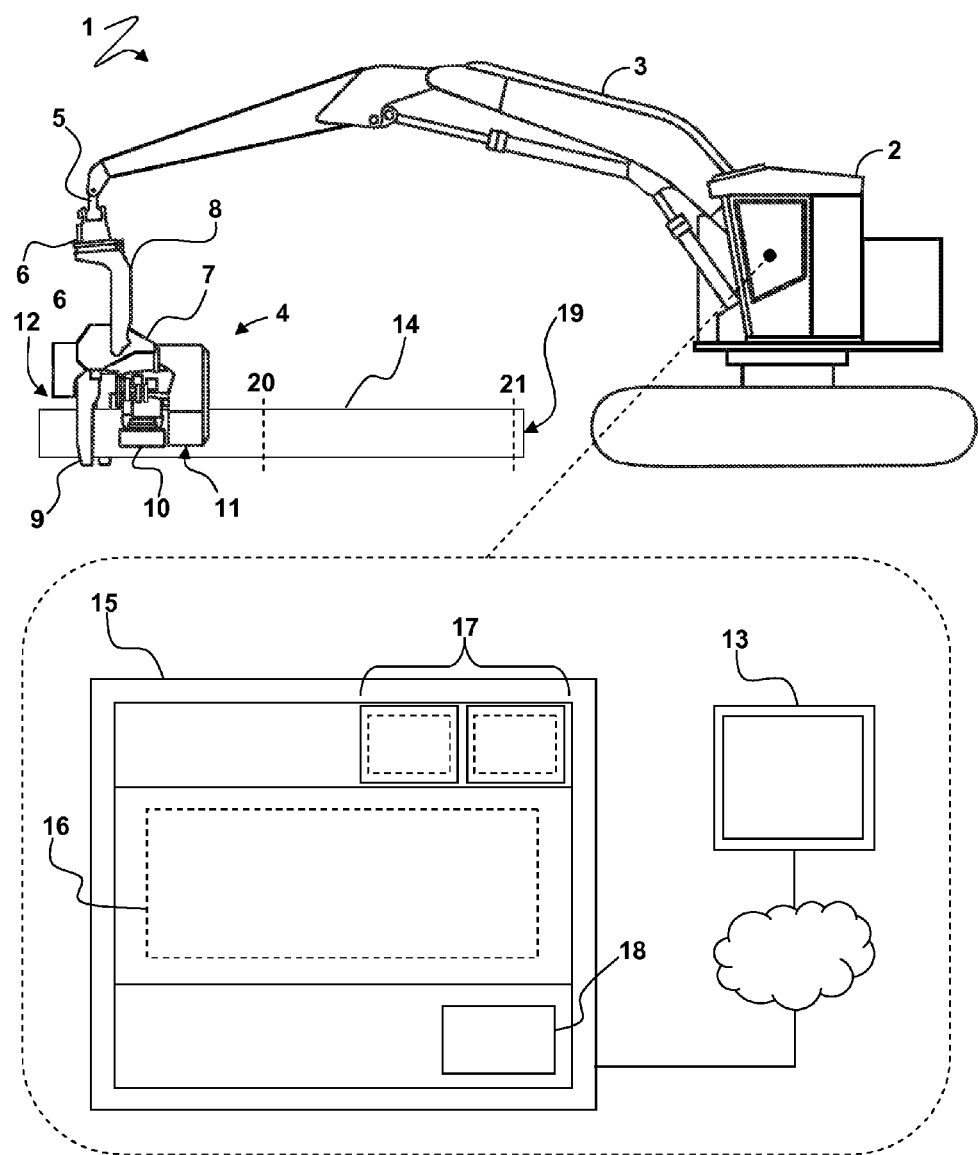
FIG. 1 is a side view of a forestry work machine including a timber-working head for processing a tree stem.

FIG. 1 illustrates a forestry work machine (generally indicated by arrow 1) including a carrier 2 supporting an articulated boom 3. A timber working implement in the form of a harvester head 4 is connected to an end of the boom 3, using a dog-bone joint 5 connected to a rotator 6, which is in turn connected to a frame 7 of the head 4 by hanger 8. In operation, the head 4 may swivel relative to the end of the boom 3 about the rotator 6, and pivotally move about its connection to the hanger 8 between a generally upright, harvesting position for felling a tree (not illustrated) and a generally prone, processing position (as illustrated) for processing the felled tree (e.g., delimbing, debarking, cutting to length).

The harvester head 4 includes grapple or delimbing arms 9 pivotally connected to the frame 7 and configured to grasp the stem of the tree. The head 4 also includes a pair of drive arms 10 pivotally connected to the frame 7 and including drive wheels configured to control the longitudinal position of the tree relative to the head 4. The harvester head 4 also includes a main chain saw at the end marked by arrow 11, and a top chain saw at the end marked by arrow 12.

The machine 1, particularly harvester head 4, may be controlled by an operator (not illustrated) using hand and foot controls as known in the art. A controller 13 controls operation of the harvester head 4 in response to data or signals received from various components of the harvester head 4 and in conjunction with the operator input devices.

The controller 13 may further receive signals from the harvester 4 pertaining to the position of the harvester 4 relative to a stem 14 (and thus length measurements of the stem 14), and diameter of the stem 14. The controller 13 may use these signals from the harvester head 4, or sensors associated with the harvester head 4, in order to determine cutting positions on the stem 14 in order to optimise the value of logs cut from the stem 14.

These cutting positions may be presented to the operator on a display 15. For example, information regarding the current log to be cut from the stem 14 may be presented in the central area 16. The next logs in the sequence may be displayed in a queuing area 17. In this embodiment, the display 15 is a touchscreen and a selectable button 18 is provided to enable the operator to manually designate an end point on the stem 14.

Operation of the forestry work machine 1 will be described with reference to FIG. 2 and FIG. 3.

Figure 2:
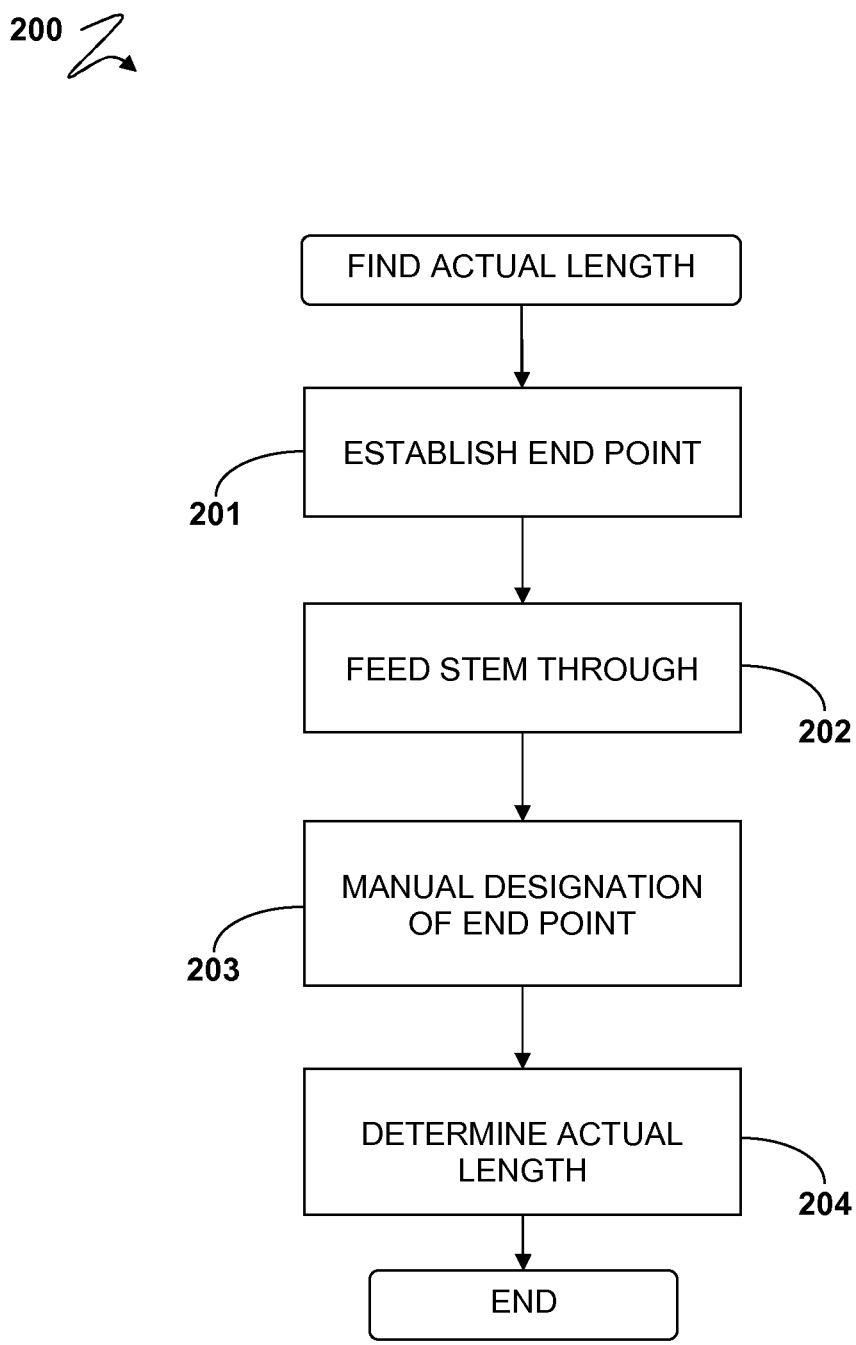
FIG. 2 is a flowchart illustrating a method for determining the actual length of a stem.

FIG. 2 illustrates a method 200 by which the actual length of the stem 14 to be processed is determined.

In the course of processing the stem 14, the operator notes that there is a break 19 in the stem 14. The operator observes that the diameter of the stem 14 at the break 19 appears to be over a minimum diameter for the stand of trees from which the stem 14 was cut, and that the length of the stem 14 up to the break 19 appears to be of log quality.

In step 201, the operator performs a cut at point 20 to establish an end point.

The operator then feeds the stem 14 through the harvester head 4 using the drive arms 10 in step 202. While the stem 14 is being fed through, the controller 13 receives signals from a distance measuring wheel (not illustrated) having a rotary encoder, indicating the distance travelled. Diameter measurements are also taken at 100 millimeter intervals using deflection of the drive arms 10 or delimbing arms 9.

In step 203 the operator determines that the head has reached a point 21 where either the mainsaw 11 or topsaw 12 can make a clean cut through the stem 14 as close as possible to the break 19, and presses the button 18 to manually designate another end point.

In step 204 the controller 13 then determines the actual length of the stem 14 to be processed.

FIG. 3 illustrates the subsequent method 300 by which the stem 14 is processed.

In step 301, the controller 13 uses the actual length and measured diameters to determine at least one cutting position along the actual length of the stem 14 such that the value of the resulting logs is optimised.

These are displayed to the operator in step 302, who can choose to make changes in step 303—for example changing the grade of the actual length of the stem 14, or manually overriding the cutting solution to alter the length of the next cut. Those changes may require re-optimisation in step 301.

If the operator approves the cutting solution, then the harvester head 4 is controlled to perform the next programmed cut in step 304. After performing the cut, the controller 7 checks whether there are any further cuts to be made in step 305. If there are, steps 303 to 305 are repeated. If not, the actual length of the stem 14 has been processed.

Figure 4A:
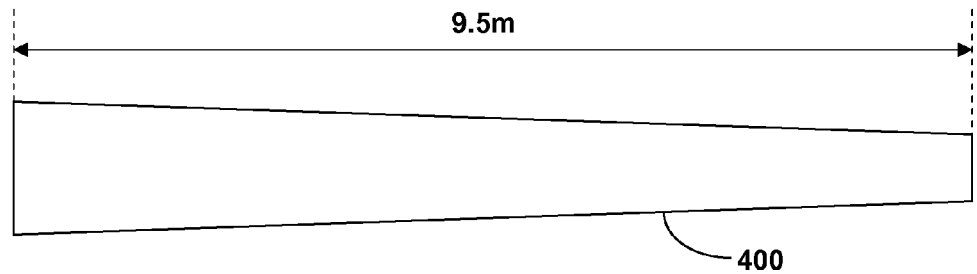
FIG. 4a illustrates a stem to be processed.
Figure 4B:
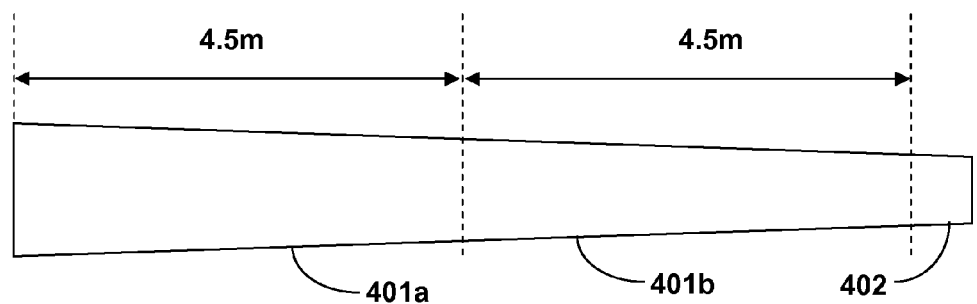
FIG. 4b illustrates a cutting solution for the stem.

FIG. 4a and FIG. 4b provide an example of optimisation of the actual length of a stem. In FIG. 4a it may be seen that the actual length of a stem 400 has been determined to be 9.5 m.

Exemplary values of various log lengths are outlined in the following Table 1:

| Log length (m) | Value ($) |
| --- | --- |
| 4.0 | 500 |
| 4.5 | 550 |
| 5.0 | 400 |
| 5.5 | 450 |
| 6.0 | 500 |
| 6.5 | 550 |
| 7.0 | 600 |
| 12.0 | 950 |

For ease of illustration the value of logs are determined based solely on length, without factoring diameter into the equation.

Calculated cutting priorities for the actual length of the stem 400 are outlined in the following Table 2:

| Priority | Value ($) | Log Composition | Total Length (m) |
| --- | --- | --- | --- |
| 1 | 1100 | 2 × 4.5 m | 9.0 |
| 2 | 1050 | 1 × 4.0 m; 1 × 4.5 m | 9.5 |
| 3 | 1000 | 2 × 4.0 m | 8.0 |

In FIG. 4b it may be seen that in addition to logs 401a and 401b, a waste portion 402 is produced by cutting priority 1. However, while cutting priority 2 produces less waste, the value of the logs produced is lower than that of cutting priority 1.

Figure 5A:
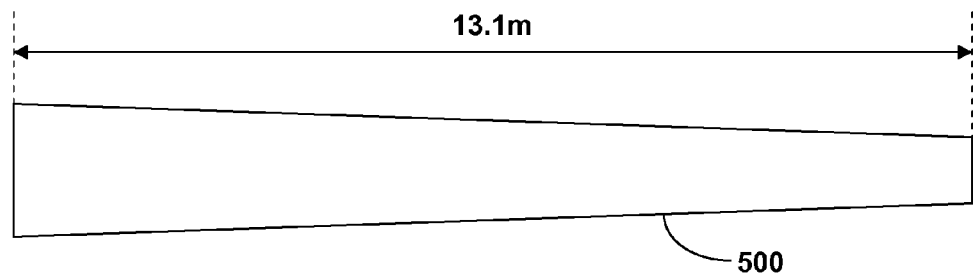
FIG. 5a illustrates a second stem to be processed.
Figure 5B:
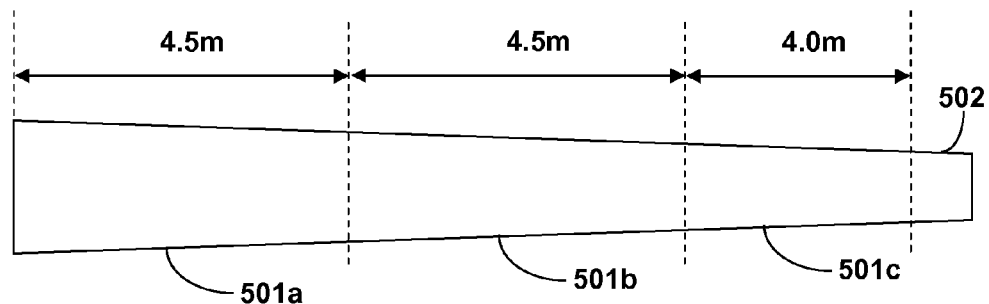
FIG. 5b illustrates a cutting solution for the second stem.

FIG. 5a and FIG. 5b provide a further example of optimisation of the actual length. In FIG. 5a it may be seen that the actual length of a stem 500 has been determined to be 13.1 m.

Calculated cutting priorities for the actual length of stem 500 are outlined in the following Table 3:

| Priority | Value ($) | Log Composition | Total Length (m) |
| --- | --- | --- | --- |
| 1 | 1600 | 2 × 4.5 m; 1 × 4.0 m | 13.0 |
| 2 | 1550 | 1 × 4.5 m; 2 × 4.0 m | 12.5 |
| 3 | 1500 | 3 × 4.0 m | 12.0 |

In FIG. 5b it may be seen that in addition to logs 501a, 501b and 501c, a waste portion 502 is produced by cutting priority 1. In contrast with the example of FIGS. 4a and 4b, the cutting priority which produces the maximum value also produces the minimum of waste.

Aspects of the present disclosure have been described by way of example only and it should be appreciated that modifications and additions may be made thereto without departing from the scope thereof as defined in the appended claims.

What is claimed is:

1. A method for processing a length of material utilising a timber-working head, comprising the steps of:
    receiving, at a processor, a signal indicating manual designation of a point along the length of material as a first end point;
    receiving, at the processor, a signal from at least one distance measuring device associated with the timber-working head, the signal indicating the distance between the first end point on the length of material and a second end point on the length of material;
    determining, at the processor, the actual length of material to be processed using the signal from the distance measuring device; and
    controlling, via the processor, using at least one of the first end point and the determined actual length of material to be processed, at least one of a cutting means of the timber-working head so as to cut the length of material and a drive mechanism of the timber-working head so as to drive the length of material relative to the timber-working head.

2. The method of claim 1, wherein the manual designation of the first end point is performed by an operator of the timber-working head.

3. The method of claim 1, wherein the manual designation of the first end point interrupts a previously established processing sequence of the length of material.

4. The method of claim 1, comprising the step of determining at least one cutting position along the actual length of material, such that the value of lengths of material between the end points and at least one cutting position is optimized.

5. The method of claim 4, wherein the at least one cutting position is a plurality of cutting positions and the plurality of cutting positions are presented sequentially.

6. The method of claim 5, comprising receiving a manual override of a next cutting position.

7. The method of claim 4, comprising receiving a manual grading of a length of material and redetermining at least one cutting position along the remaining actual length of material.

8. The method of claim 1, comprising the steps of:
   determining at least one cutting position along the actual length of material; and
   controlling the timber-working head to cut the length of material at the at least one cutting position using the cutting means.

9. An apparatus for processing a length of material, comprising:
   at least one processor configured to:
      receive a signal indicating manual designation of a point along the length of material as a first end point;
      receive at least one signal from at least one distance measuring device associated with a timber-working head, the signal indicating the distance between the first end point and a second end point on the length of material;
      determine the actual length of material to be processed using the at least one signal; and
      control, using at least one of the first end point and the determined actual length of material to be processed, at least one of a cutting means of the timber-working head so as to cut the length of material and a drive mechanism of the timber-working head so as to drive the length of material relative to the timber-working head.

10. The apparatus of claim 9, wherein the processor is configured to interrupt a previously established processing sequence of the length of material on receiving the signal indicating the manual designation of the first end point.

11. The apparatus of claim 9, wherein the processor is configured to determine at least one cutting position along the actual length of material, such that the value of lengths of material between the end points and at least one cutting position is optimized.

12. The apparatus of claim 11, wherein the processor is configured to cause cutting positions to be presented sequentially.

13. The apparatus of claim 12, wherein the processor is configured to receive a manual override of a next cutting position.

14. The apparatus of claim 11, wherein the processor is configured to receive a manual grading of a length of material and redetermine at least one cutting position along the remaining actual length of material.

15. A system for processing a length of material, comprising:
   a timber-working head, comprising:
      at least one cutting means;
      a drive mechanism configured to drive the length of material relative to the timber-working head; and
      at least one distance measuring device; and
   at least one processor configured to:
      receive a signal indicating manual designation of a point along the length of material as a first end point;
      receive at least one signal from the distance measuring device, the at least one signal indicating the distance between the first end point to a second end point on the length of material with a sensor;
      determine the actual length of material to be processed using the at least one signal from the distance measuring device;
      determine at least one cutting position along the actual length of material, such that the value of lengths of material between the end points and cutting position is optimized; and
      control the timber-working head to cut the length of material at the cutting position using the cutting means.

16. The system of claim 15, wherein the processor is configured to interrupt a previously established processing sequence of the length of material on receiving the signal indicating the manual designation of the first end point.

17. The apparatus of claim 15, wherein the processor is configured to cause cutting positions to be presented sequentially.

18. The apparatus of claim 17, wherein the processor is configured to receive a manual override of a next cutting position.

19. The apparatus of claim 15, wherein the processor is configured to receive a manual grading of a length of material and redetermine at least one cutting position along the remaining actual length of material.

20. The apparatus of claim 15, wherein the distance measuring device measures distance as the drive mechanism drives the length of material.

\* \* \* \* \*